United States Patent Office 3,399,193
Patented Aug. 27, 1968

3,399,193
N-TERTIARY AMINO-ALKYLENE 4- OR 5-NITRO-IMIDAZOLES AND THEIR PREPARATION
Pier Nicola Giraldi and Vittorio Mariotti, Milan, Italy, assignors to Carlo Erba S.p.A., Milan, Italy, a corporation of Italy
No Drawing. Filed Aug. 4, 1965, Ser. No. 477,318
7 Claims. (Cl. 260—247.5)

ABSTRACT OF THE DISCLOSURE

New imidazole-derivatives, and the process for making the same, are disclosed. These derivatives are made by reacting metal salts of 4- or 5-nitro-imidazole with $\beta$-halageno-ethyl-(morpholine, pyrrolidine, or dimethyl amine). The imidazole-derivatives exhibit antitrichomonas activity.

---

This patent relates to preparation of new imidazole-derivatives with amine side chain, having following general formula:

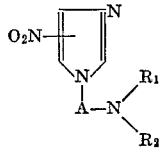

where A is an either branched or not-branched aliphatic chain with 1 to 6 C atoms, $R_1$ and $R_2$ are either identical to or different from each other, and represent H, aliphatic chains either branched or not, substituted or not, aryl-, alkyl-aryl radicals, and can be a part of a heterocyclic ring.

The position of the nitro-group can be in positions 4 or 5; the isomers can be separated by means of fractionated crystallization.

These substances can be prepared for example by reaction of metal salts, preferably sodium or silver salts, of 4(5)-nitro-imidazole with substances having following formula:

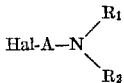

where A, $R_1$ and $R_2$ have the aforementioned meanings, in dry solvents such as xylene, toluene, etc.

Some compounds of those thus synthesized show a considerable "in vivo" and "in vitro" activity on many protozoa, particularly marked on Trichomonas vaginalis. In addition to this, substances of this class, such as for instance N-$\beta$-ethyl-morpholino-4(5)-nitro-imidazole show a good solubility in water, much higher than that owned by similar products active on Trichomonas vaginalis such as e.g., N-$\beta$-oxy-ethyl-2-methyl-5-nitro-imidazole.

This makes resorption of substances considerably easier when "in vivo" administration is required, with successive quick removal avoiding harmful accumulation phenomena. Following examples illustrate but do not limit the subject invention:

EXAMPLE 1

6 g. 4(5)-nitro-imidazole sodium salt and 9 g. $\beta$-chloro-ethyl-morpholine are allowed to react in 200 ml. dry toluene. The mixture is refluxed for 50 hr., then cooled and filtered from the solid residue. The solvent is evaporated under reduced pressure. The half-solid product thus obtained solidifies by addition of petroleum ether and ethyl ether.

Crystallization from water results in N-$\beta$-ethyl-morpholino-(5)-nitro-imidazole (M.P. 110–111° C.); from mother liquors N-$\beta$-ethyl-morpholino-(4)-nitro-imidazole (M.P. 104–106° C.) is obained.

EXAMPLE 2

4.2 g. 4(5)-nitro-imidazole sodium salt and 4.02 g. $\beta$-chloro-ethyl-pyrrolidine are refluxed in 120 ml. dry toluene for 24 hr., then the solid residue is filtered, and the solvent is evaporated under reduced pressure. The so obtained oil solidifies by adding petroleum ether.

Crystallization from hexane results in a mixture of N-$\beta$-ethyl-pyrrolidino-(5)-nitro-imidazole and N-$\beta$-ethyl-pyrrolidino-(4)-nitro-imidazole.

EXAMPLE 3

3.4 g. 4(5)-nitro-imidazole and 3.2 g. N-$\beta$-diethylamino-ethyl-chloride are refluxed for 24 hours in 120 ml. dry toluene. After filtration and evaporation of the solvent, the residue oil is dissolved in ethanol and treated with bone charcoal. The residue thus obtained solidifies by addition of hexane.

Crystallization from hexane results in a mixture of N-$\beta$-diethyl-amino-ethyl-(5)-nitro-imidazole and N-$\beta$-diethyl-amino-ethyl-(4)-nitro-imidazole.

We claim:
1. N-$\beta$-diethyl-amino-ethyl-(5)-nitro-imidazole.
2. N-$\beta$-diethyl-amino-ethyl-(4)-nitro-imidazole.
3. N-$\beta$-morpholino-ethyl-(5)-nitro-imidazole.
4. N-$\beta$-morpholino-ethyl-(4)-nitro-imidazole.
5. N-$\beta$-pyrrolidino-ethyl-(5)-nitro-imidazole.
6. N-$\beta$-pyrrolidino-ethyl-(4)-nitro-imidazole.
7. A process for preparing imidazole-derivatives of the formula:

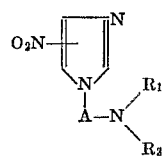

wherein A is alkylene of 1 to 6 carbon atoms and $R_1$ and $R_2$ are ethyl or, when taken together, along with the N-atom, are morpholino or pyrrolidino, and the nitro group is in the 4 or 5 position, by reacting metal salts of 4(5)-nitro-imidazole, in suitable solvent,, with compounds having the formula:

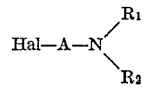

wherein A, $R_1$ and $R_2$ have been previously defined and thereafter separating the resultant nitro-isomers by fractional crystallization.

No references cited.

NICHOLAS S. RIZZO, *Primary Examiner.*

JOSE TOVAR, *Assistant Examiner.*